US008611997B1

(12) United States Patent
McCurry

(10) Patent No.: US 8,611,997 B1
(45) Date of Patent: Dec. 17, 2013

(54) SYSTEM AND METHOD FOR FORMING A CHARGE STORAGE ASSEMBLY

(75) Inventor: Troy L. McCurry, West Union, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 13/594,639

(22) Filed: Aug. 24, 2012

(51) Int. Cl.
*H01G 9/08* (2006.01)

(52) U.S. Cl.
USPC .................................. 607/5; 607/36; 361/518

(58) Field of Classification Search
USPC ............................................ 607/36; 361/518
See application file for complete search history.

(56) References Cited

U.S. PATENT DOCUMENTS

| 7,012,799 | B2 * | 3/2006 | Muffoletto et al. ........... 361/517 |
| 7,457,102 | B2 * | 11/2008 | Miura et al. .................. 361/519 |
| 7,710,713 | B2 | 5/2010 | Restorff |
| 2008/0068779 | A1 | 3/2008 | Restorff |

FOREIGN PATENT DOCUMENTS

EP        1903584        3/2008

* cited by examiner

*Primary Examiner* — Michael Kahelin
(74) *Attorney, Agent, or Firm* — Theresa Raymer; Steven M. Mitchell

(57) ABSTRACT

A capacitor assembly is configured for use with an implantable medical device (IMD. The capacitor assembly may include a stack assembly having at least one anode stack between outer cathodes, and a housing having a case secured to a lid. The case and the lid define an internal chamber that retains the stack assembly. One of the case or the lid comprises a folded double wall connected to a drawn end. A recessed area is defined between the folded double wall and the drawn end. A linear edge of the other of the case and the lid is retained within the recessed area.

20 Claims, 10 Drawing Sheets

SYSTEM AND METHOD FOR FORMING A CHARGE STORAGE ASSEMBLY

BACKGROUND OF THE INVENTION

Embodiments generally relate to a charge storage assembly, and, more particularly, to a system and method for forming a charge storage assembly that may be used with a medical device.

Numerous medical devices exist today, including but not limited to electrocardiographs ("ECGs"), electroencephalographs ("EEGs"), squid magnetometers, implantable pacemakers, implantable cardioverter-defibrillators ("ICDs"), neurostimulators, electrophysiology ("EP") mapping and radio frequency ("RF") ablation systems, and the like (hereafter generally "implantable medical devices" or "IMDs"). IMDs commonly employ one or more leads with electrodes that either receive or deliver voltage, current or other electromagnetic pulses (generally "energy") from or to an organ or tissue (collectively hereafter "tissue") for diagnostic or therapeutic purposes.

Certain types of IMDs include internal charge storage members, such as one or more capacitors. The charge storage members may be connected to a switch circuit or network also referred to as an H-bridge. Conventional high voltage H-bridges include a network of transistors that are controlled to open and close in different combinations to deliver stored energy from the charge storage members to a patient through the electrodes.

Typically, a capacitor of an IMD includes a stack assembly having anodes and cathodes secured within a housing. The housing may include a case and a lid. After the stack assembly is secured within the case, the lid is positioned over the case. The lid and the case are then secured together, such as through welding at seams between the lid and the case.

Typically, the outer, exposed edges of the case are inwardly-offset toward an interior chamber of the case. The offset forms a recessed area about the outer edges that receives an outer edge of the lid. The lid and the case are then typically laser-welded proximate an interface between the lid and the case.

However, the inward offset of the case occupies space within the case. Accordingly, the case typically needs to be large enough to accommodate the stack assembly. Yet, with IMDs becoming smaller, internal space within the IMDs may be at a premium. The inward offset of the case into the internal chamber of the case may cause the capacitor to be too large for some applications.

SUMMARY

Certain embodiments provide a capacitor assembly configured for use with an implantable medical device (IMD). The capacitor assembly may include a stack assembly having at least one anode stack between outer cathodes, and a housing having a case secured to a lid. The case and the lid define an internal chamber that retains the stack assembly. One of the case or the lid includes a folded double wall connected to a drawn end. A recessed area is defined between the folded double wall and the drawn end. A linear edge of the other of the case and the lid is retained within the recessed area.

In an embodiment, the lid includes the folded double wall and the case includes the linear edge. Alternatively, the case includes the folded double wall and the lid includes the linear edge.

The folded double wall may be folded toward the internal chamber. Alternatively, the folded double wall may be folded away from the internal chamber.

The folded double wall may be folded 180° from a central plane. The drawn end may be perpendicular to the central plane.

The lid and the case may be welded together about a seam proximate the linear edge and the folded double wall. The drawn end protects the stack assembly from receiving energy imparted during a welding operation.

Certain embodiments provide a method of forming a capacitor assembly configured for use with an implantable medical device (IMD). The method may include folding an end of one of a case or lid to form a folded double wall, drawing the end away from a central plane to form a drawn end that defines a recessed area with the double wall, positioning a stack assembly into an internal chamber of the case, and securing the case to the lid by positioning a linear edge of one of the case or lid into the recessed area of the other of the case or lid.

The folding operation may include inwardly-folding the end of the one of the case or lid. Alternatively, the folding operation may include outwardly-folding the end of the one of the case or lid.

The folding operation may include folding the end 180° from a central plane. The drawing operation may include perpendicularly drawing the drawn end from the central plane.

The method may also include welding the case and lid together about a seam proximate the linear edge and the folded double wall. The drawn end protects the stack assembly from receiving energy imparted during the welding operation.

DETAILED DESCRIPTION

Figure 1:
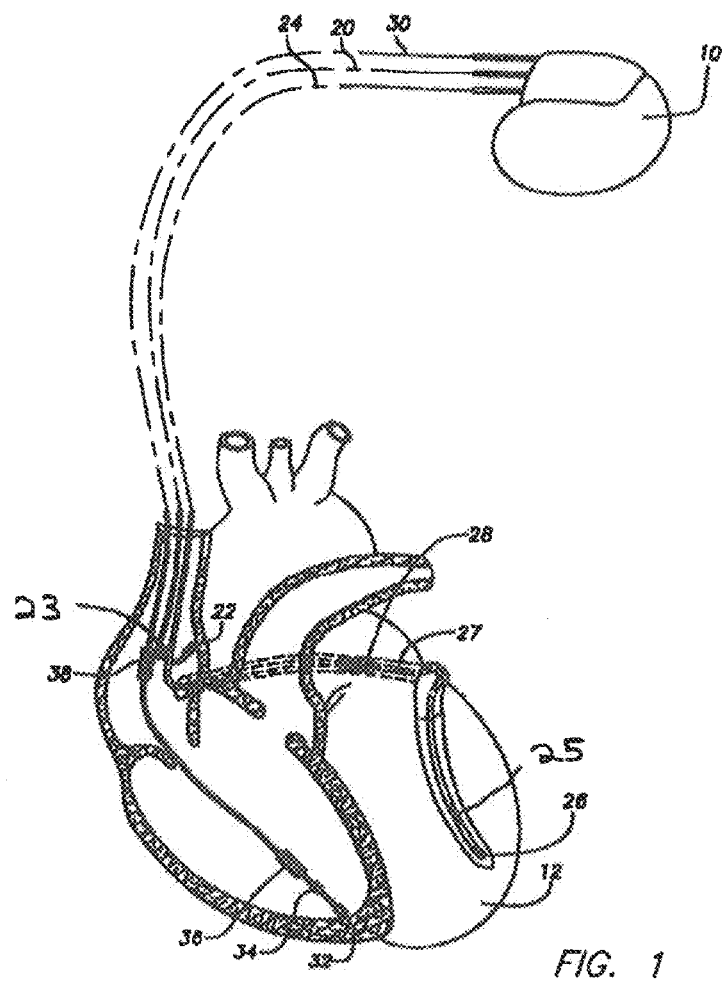
FIG. 1 illustrates a simplified view of an exemplary implantable medical device (IMD) in electrical communication with at least three leads implanted into a patient's heart, according to embodiment.

FIG. 1 illustrates a simplified view of an IMD 10 in electrical communication with at least three leads 20, 24, and 30 implanted into a patient's heart 12, according to embodiment. To sense atrial cardiac signals and to provide right atrial chamber stimulation therapy, the IMD 10 may be coupled to an implantable right atrial lead 20 including at least one atrial tip electrode 22 that may be implanted in the patient's right atrial appendage. The right atrial lead 20 may also include an atrial ring electrode 23 configured to allow bipolar stimulation or sensing in combination with the atrial tip electrode 22.

To sense the left atrial and left ventricular cardiac signals and to provide left-chamber stimulation therapy, the IMD 10 may be coupled to a "coronary sinus" lead 24 designed for placement in the "coronary sinus region" via the coronary sinus ostium in order to place a distal electrode adjacent to the left ventricle and additional electrode(s) adjacent to the left atrium. As used herein, the phrase "coronary sinus region" refers to the venous vasculature of the left ventricle, including any portion of the coronary sinus, great cardiac vein, left marginal vein, left posterior ventricular vein, middle cardiac vein, and/or small cardiac vein or any other cardiac vein accessible by the coronary sinus.

Accordingly, the coronary sinus lead 24 may be designed to receive atrial and/or ventricular cardiac signals, deliver left ventricular pacing therapy using at least one left ventricular tip electrode 26 for unipolar configurations or in combination with left ventricular ring electrode 25 for bipolar configurations, deliver left atrial pacing therapy using at least one left atrial ring electrode 27 as well as shocking therapy using at least one left atrial coil electrode 28.

The IMD 10 is also shown in electrical communication with the patient's heart 12 by way of an implantable right ventricular lead 30 including, in the embodiment, a right ventricular (RV) tip electrode 32, a right ventricular ring electrode 34, a right ventricular coil electrode 36, a superior vena cava (SVC) coil electrode 38, and so on. Typically, the right ventricular lead 30 is inserted transvenously into the heart 12 so as to place the right ventricular tip electrode 32 in the right ventricular apex such that the RV coil electrode 36 is positioned in the right ventricle and the SVC coil electrode 38 is positioned in the right atrium and/or superior vena cava. Accordingly, the right ventricular lead 30 is capable of receiving cardiac signals, and delivering stimulation in the form of pacing and shock therapy to the right ventricle.

Figure 2:
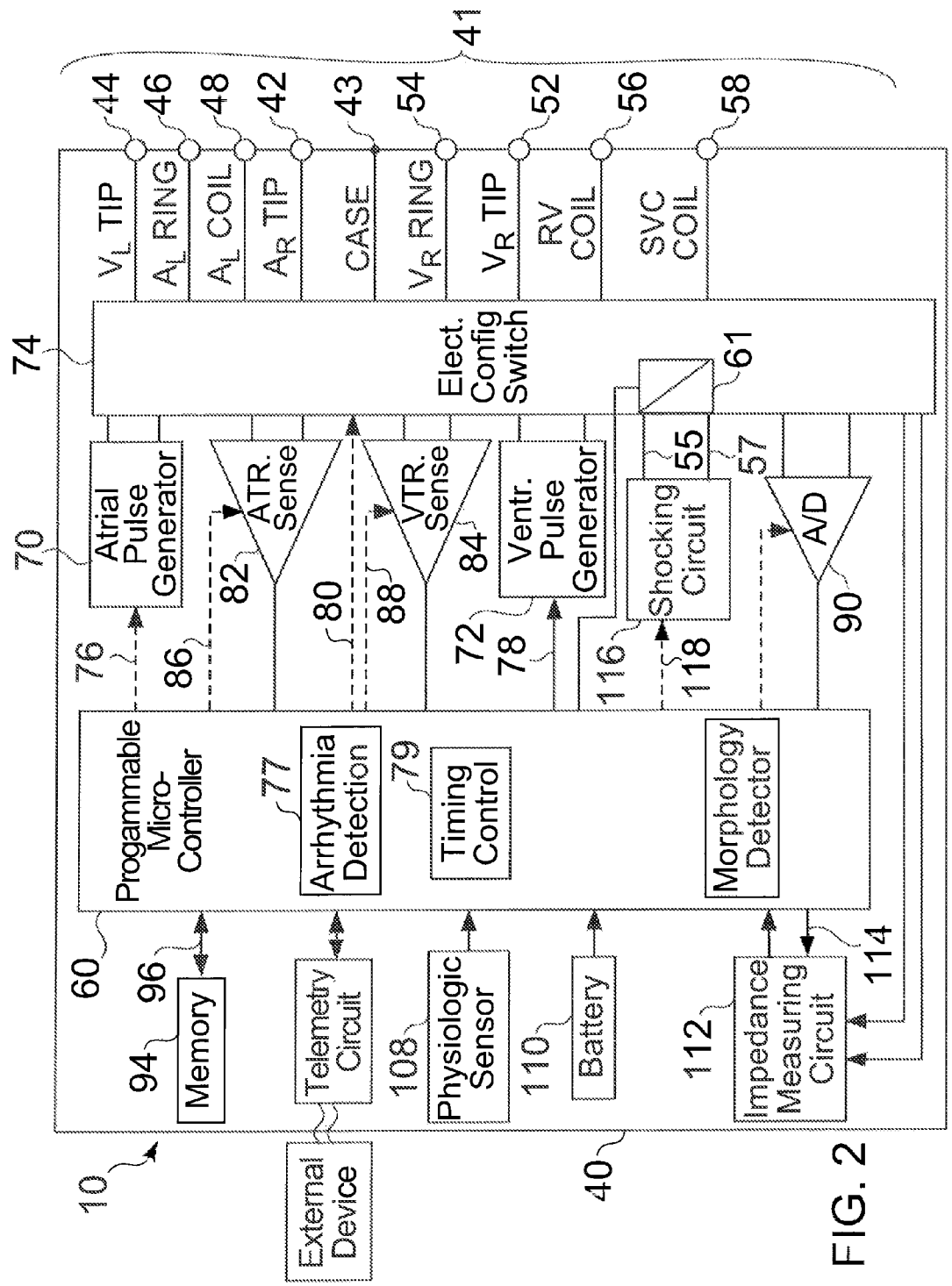
FIG. 2 illustrates a functional block diagram of an IMD, according to an embodiment.

FIG. 2 illustrates a functional block diagram of the IMD 10, according to an embodiment. The IMD 10 may be capable of treating both fast arrhythmia and slow arrhythmia with stimulation therapy, including cardioversion, defibrillation, and pacing stimulation, for example. While a particular multi-chamber device is shown, the multi-chamber device is for illustration purposes only.

The IMD 10 may include a housing 40, which is often referred to as "can," "case," or "case electrode," and which may be programmably selected to act as the return electrode for all "unipolar" modes. The housing 40 may further be used as a return electrode alone or in combination with one or more of the coil electrodes 28, 36, or 38 (shown in FIG. 1) for defibrillation shocking purposes. The housing 40 may also include a connector 41 having a plurality of terminals 42, 43, 44, 45, 46, 48, 52, 54, 56, and 58 (shown schematically and, for convenience, the names of the electrodes to which they are connected are shown next to corresponding terminals). As such, in order to achieve right atrial sensing and stimulation, the connector 41 includes at least one right atrial tip terminal (RA TIP) 42 adapted for connection to the atrial tip electrode 22. The connector 41 may also include a right atrial ring terminal (RA RING) for connection to the right atrial ring electrode 23.

To achieve left chamber sensing, pacing, and/or shocking, the connector 41 may include a left ventricular tip terminal (LV TIP) 44, a left ventricular ring terminal (LV RING) 25, a left atrial ring terminal (LA RING) 46, and a left atrial shocking coil terminal (LA COIL) 48, that are adapted for connection to the left ventricular tip electrode 26, the left ventricular ring electrode 25, the left atrial ring electrode 27, and the left atrial coil electrode 28, respectively.

To support right ventricular sensing, pacing, and/or shocking, the connector 41 may further include a right ventricular tip terminal (RV TIP) 52, a right ventricular ring terminal (RV RING) 54, a right ventricular shocking coil terminal (RV COIL) 56, and an SVC shocking coil terminal (SVC COIL) 58, which are adapted for connection to the right ventricular (RV) tip electrode 32, the RV ring electrode 34, the RV coil electrode 36, and the SVC coil electrode 38, respectively.

A programmable microcontroller 60 controls the modes of stimulation therapy. The microcontroller 60 typically includes a microprocessor, or equivalent control circuitry, for controlling the delivery of stimulation therapy, and may include RAM or ROM memory, logic and timing circuitry, state machine circuitry, and/or I/O circuitry. The microcontroller 60 may have the ability to process or monitor various input signals (data) as controlled by a program code stored in a designated block of memory. The microcontroller 60 may further include timing control circuitry 79 which may be used to control timing of the stimulation pulses such as, e.g., pacing rate, atrio-ventricular (AV) delay, atrial interchamber (A-A) delay, and/or ventricular interchamber (V-V) delay.

An atrial pulse generator 70 and ventricular pulse generator 72 generate stimulation pulses for delivery by the right atrial lead 20, the right ventricular lead 30, and/or the coronary sinus lead 24 via a switch 74. The atrial pulse generator 70 and the ventricular pulse generator 72 are generally controlled by the microcontroller 60 via appropriate control signals 76 and 78, respectively, to trigger or inhibit the stimulation pulses.

The switch 74 includes a plurality of switches for connecting the desired electrodes to the appropriate I/O circuits, thereby providing complete electrode programmability. The switch 74, in response to a control signal 80 from the microcontroller 60, determines the polarity of the stimulation pulses (e.g., unipolar, bipolar, cross-chamber, and the like) by selectively closing the appropriate combination of switches. Atrial sensing circuits 82 and ventricular sensing circuits 84 may also be selectively coupled to the right atrial lead 20, coronary sinus lead 24, and the right ventricular lead 30 through the switch 74, for detecting the presence of cardiac activity in each of the four chambers of the heart.

The outputs of the atrial sensing circuit 82 and ventricular sensing circuits 84 may be connected to the microcontroller 60 for triggering or inhibiting the atrial and ventricular pulse generators 70 and 72, respectively, in a demand fashion, in response to the absence or presence of cardiac activity, respectively, in the appropriate chambers of the heart. The atrial and ventricular sensing circuits 82 and 84, in turn, may receive control signals over signal lines 86 and 88 from the microcontroller 60, for controlling the gain, threshold, polarization charge removal circuitry, and the timing of any blocking circuitry coupled to the inputs of the atrial and ventricular sensing circuits 82 and 84. For arrhythmia detection, the IMD 10 includes an arrhythmia detector 77 that utilizes the atrial and ventricular sensing circuits 82 and 84 to sense cardiac signals, for determining whether a rhythm may be physiologic or pathologic.

Cardiac signals are also applied to the inputs of a data acquisition system 90 which is depicted as an analog-to-digital (A/D) converter for simplicity of illustration. The microcontroller 60 may further be coupled to a memory 94 by a suitable data/address bus 96, in which the programmable operating parameters used by the microcontroller 60 are stored and modified, as required, so as to customize the operation of the IMD 10 to suit the needs of particular patients. The IMD 10 may additionally include a power source, illustrated as a battery 110, for providing operating power to all the circuits of FIG. 2. For the IMD 10 employing shocking therapy, the battery 110 operates at low current drains for long periods of time, preferably less than 10 uA, and may also be capable of providing high-current pulses when the patient requires a shock pulse, preferably in excess of 2 A, at voltages above 2 V, for periods of 10 seconds or more. The battery 110 preferably has a predictable discharge characteristic such that elective replacement time can be detected. A physiologic sensor 108 detects motion of the IMD and thus, patient, to determine an amount of activity.

The IMD 10 includes an impedance measuring circuit 112 which is enabled by the microcontroller 60 by control signal 114. The uses for an impedance measuring circuit 112 include, but are not limited to, lead impedance surveillance during the acute and chronic phases for proper lead positioning or dislodgement, detecting operable electrodes and automatically switching to an operable pair in case dislodgement should occur, measuring respiration or minute ventilation, measuring thoracic impedance for determining shock thresholds, detecting when the device has been implanted, measuring stroke volume, detecting opening of heart valves, and so on.

The IMD 10 may be used as an implantable cardioverter defibrillator (ICD) device by detecting the occurrence of an arrhythmia, and automatically applying an appropriate electrical stimulation or shock therapy to the heart aimed at terminating the detected arrhythmia. To achieve the previously specified goal, the microcontroller 60 further controls a shocking circuit 116 by way of a control line 118. The shocking circuit 116 includes charge storage members, such as one or more capacitor assemblies. The charge storage members are charged by the battery 110 before delivering stimulating energy such as high energy shocks (e.g., 10 Joules, 20 Joules, 35 Joules). The charge storage members deliver the stimulating energy over positive and negative lines 55 and 57. The switch 74 includes a switch network 61 that is electrically disposed between the positive and negative lines 55 and 57, and the appropriate output terminals 42, 43, 44, 46, 48, 52, 54, 56, and 58 of the connector 41. The switch network 61 may include a collection of switches arranged in an H-bridge architecture, that change between open and closed states to disconnect and connect the charge storage members and the desired output terminals of the connector 41.

Figure 3:
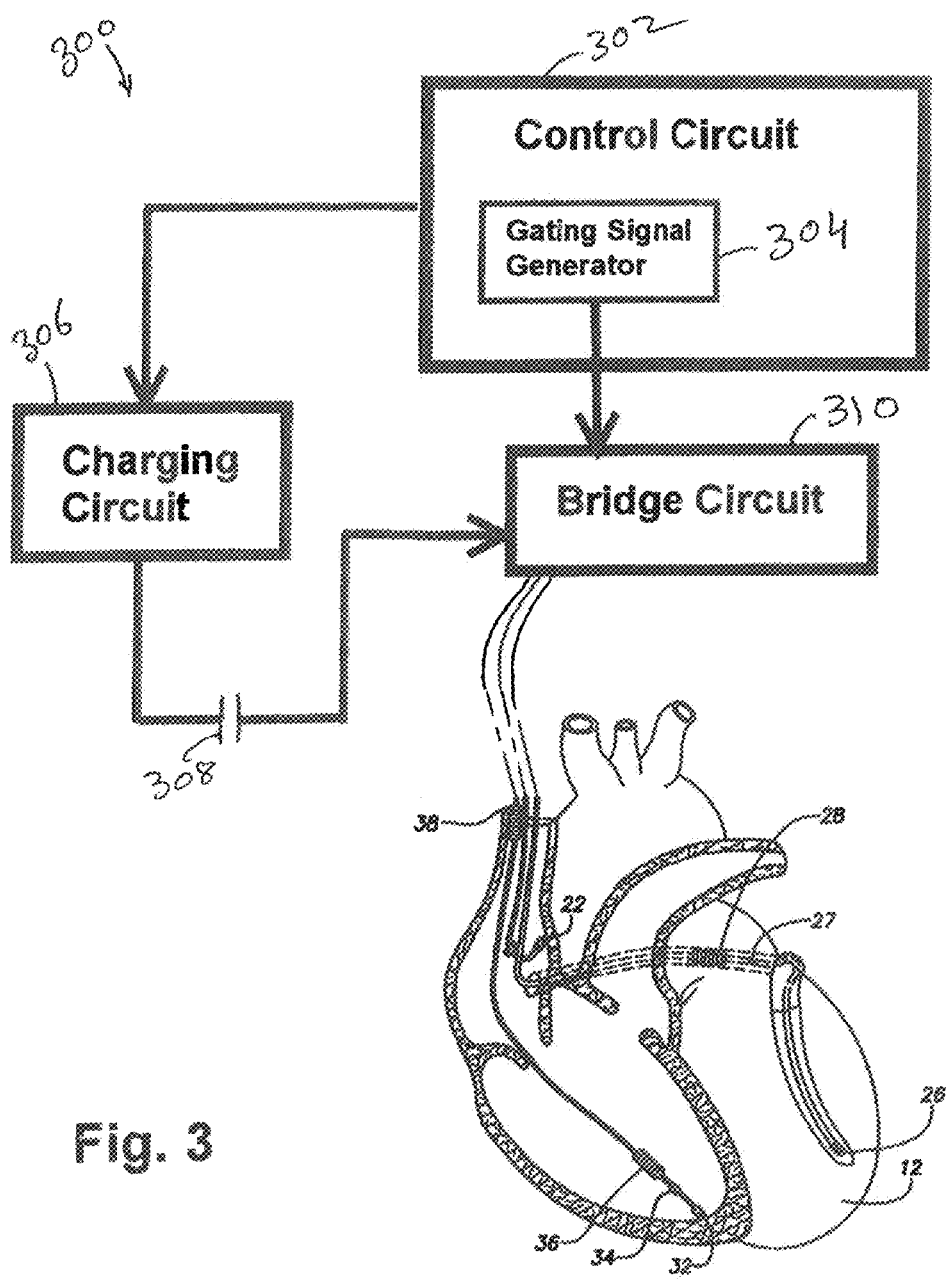
FIG. 3 illustrates a simplified block diagram of a portion of an IMD for delivering high energy shocks, according to an embodiment.

FIG. 3 illustrates a simplified block diagram of a portion of an IMD 300 for delivering high energy shocks, according to an embodiment. The IMD 300 may be configured to deliver cardioversion and defibrillation high energy shocks, for example. The IMD 300 includes a control circuit 302, a gating signal generator 304, a charging circuit 306, one or more charge storage capacitors 308, and a bridge circuit 310. The control circuit 302 controls cardiac defibrillation operation. The control circuit 302 may generate commands for other components used in connection with cardioversion or defibrillation modes of operation based on programmed instructions. For example, the control circuit 302 monitors the heart action and determines when a tachyarrhythmic condition is occurring. The control circuit 302 causes the charging circuit 306 to charge up the storage capacitors 308 up to a programmed setting. For example the storage capacitors 308 may be charged up to 800 volts. In an embodiment, the storage capacitors 308 may be a combination of multiple capacitors to store very high charge (e.g., 20 Joules, 30 Joules, 35 Joules). Alternatively, a bank of capacitors or other energy storage devices may be used. When the charging cycle is complete, the control circuit 302 causes the gating signal generator 304 to direct the bridge circuit 310 to connect a predetermined combination of electrodes to the storage capacitor(s) 308 and discharge the predetermined energy to select electrodes 28-36. In an embodiment, three electrodes 28-36 may be used for defibrillation. Alternatively, fewer or more than three electrodes may be used. In another embodiment, a left ventricular lead may be provided with one or multiple electrodes that operate as high energy discharge sites.

Figure 4:
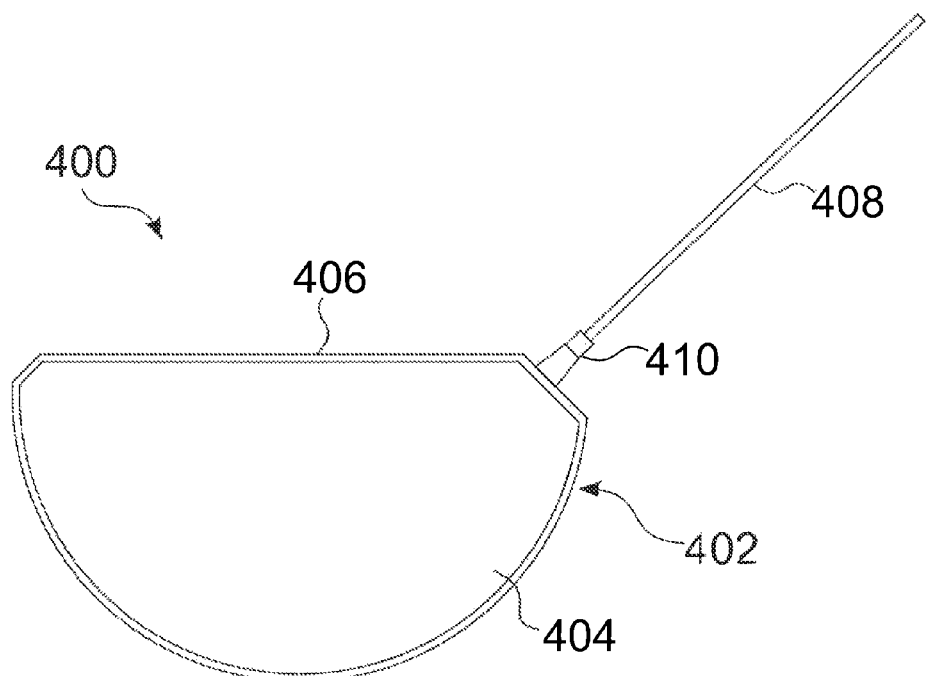
FIG. 4 illustrates a lateral view of a capacitor assembly, according to an embodiment.
Figure 5A:
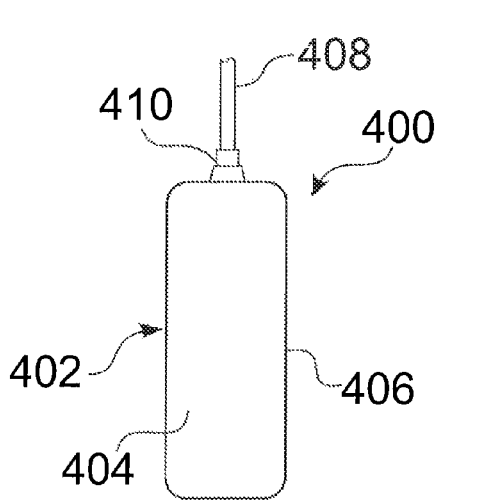
FIG. 5a illustrates an end view of a capacitor assembly, according to an embodiment.
Figure 5B:
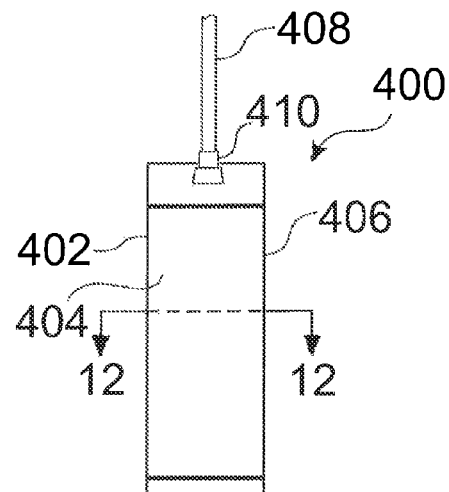
FIG. 5b illustrates a top view of a capacitor assembly, according to an embodiment.

FIG. 4 illustrates a lateral view of a capacitor assembly 400, according to an embodiment. FIGS. 5a and 5b illustrate end and top views, respectively, of the capacitor assembly 400. Referring to FIGS. 4, 5a, and 5b, the capacitor assembly 400 may be an electrolytic capacitor assembly 400 that may be used within an IMD, such as the IMD 10 or the IMD 300 described above.

The capacitor assembly 400 includes a housing 402 having a case 404 and a lid 406. The housing 402 may be formed of metal, such as stainless steel. However, the housing 402 may be formed of various other metals. The case 404 and the lid 406 are secured together, such as through laser welding, and define an internal chamber (not shown in FIG. 4) that is configured to receive and retain a stack sub-assembly having one or more anode stacks and cathodes. An insulated wire 408 extends from the housing 402 and electrically and mechanically contacts the one or more anode stacks within the internal chamber of the housing 402. The insulated wire 408 may be formed from aluminum, for example, with an insulating material that surrounds the aluminum.

A grommet 410 extends from the housing 408 and surrounds a portion of the insulated wire 408. The grommet 410 may be formed of rubber, for example, and provides a seal between the housing 402 and the insulated wire 408. Additionally, the grommet 410 insulates the insulated wire 408 from the housing 402.

As shown in FIG. 4, the capacitor assembly 400 is shown as semi-circular in shape. However, the capacitor assembly 400 may be various shapes and sizes, such as square, rectangular, circular, and the like. In general, the capacitor assembly 400 may be sized and shaped to fit within an IMD.

Figure 6:
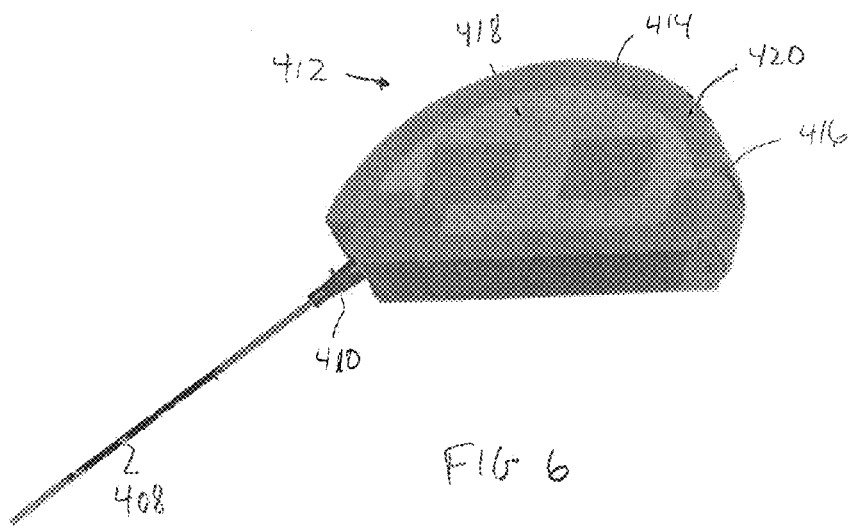
FIG. 6 illustrates an isometric view of a stack sub-assembly, according to an embodiment.

FIG. 6 illustrates an isometric view of a stack sub-assembly 412, according to an embodiment. The stack sub-assembly 412 is configured to be positioned within the internal chamber defined by the housing 402 of the capacitor assembly 400 (shown in FIG. 1). The stack sub-assembly 412 may include a plurality of anode stacks 414 separated from one another by insulating dividers 416 and cathodes 418. As shown in FIG. 6, a cathode 418 is placed on each lateral surface of the stack sub-assembly 412. The outer cathodes 418 are configured to abut against internal walls of the housing 402.

Each anode within an anode stack 414 may be formed of aluminum, for example. Each cathode 418 may be formed of titanium, for example.

An insulating material 420 that may include an adhesive, such as tape, laminate, or the like, surrounds outer edges of each anode stack 414. The insulating material 420 is configured to be positioned between an anode stack 414 and interior surfaces of the housing 402. Thus, the insulating material 420 prevents outer edges of the anode stacks 414 from contacting the interior surfaces of the housing 402. In this manner, the insulating material 420 prevents arcing between the anode stacks 414 and the housing 402.

The insulated wire 408 is electrically connected to each anode stack 414. For example, a distal end of the insulated wire 408 may be welded to edge portions of each anode stack 414.

The stack sub-assembly 412 may include more or less anode stacks 414 than shown. Moreover, each anode stack 414 may include any number of anodes.

Figure 7:
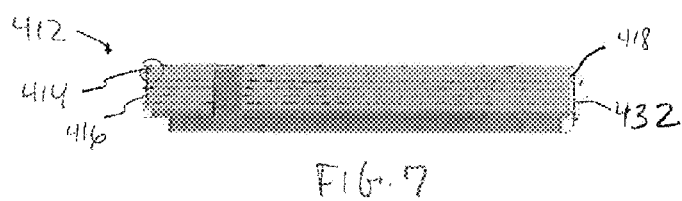
FIG. 7 illustrates an edge view of a stack sub-assembly, according to an embodiment.
Figure 8:
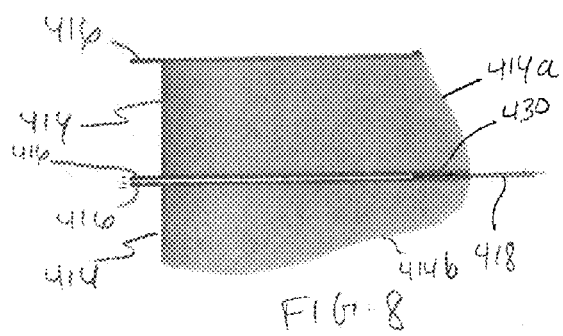
FIG. 8 illustrates a close-up edge view of anode stacks separated from one another by cathodes and insulating dividers, according to an embodiment.

FIG. 7 illustrates an edge view of the stack sub-assembly 412, according to an embodiment. FIG. 8 illustrates a close-up edge view of anode stacks 414 separated from one another by cathodes 418 and insulating dividers 416, according to an embodiment. Referring to FIGS. 7 and 8, each anode stack 414 may include one or more anodes. For example, each anode stack 414 may include four or five anodes. The insulating dividers 416 may be formed from paper, for example. The anode stack 414a is separated from the anode stack 414b by a top insulating divider 416a and a bottom insulating divider 416b. An end 430 of the cathode 418 is sandwiched between edges of the insulating dividers 416a and 416b. As shown in FIG. 7, the cathodes 418 are connected together by way of a weld 432, for example.

Referring to FIGS. 4-8, the stack sub-assembly 412 is positioned within the internal chamber of the case 404. Once the stack sub-assembly 412 is securely positioned within the case 404, the lid 406 is positioned on the case 404, and may then be laser-welded to the case 404 to form a hermetic seal. As noted above, the outer cathodes 418 of the stack sub-assembly 412 contact opposite inner walls of the housing 402, thereby creating a ground.

In operation, the capacitor assembly 400 is configured to store current until such time as a control unit, such as the microcontroller 60 shown in FIG. 2, of an IMD operates to discharge the current from the capacitor assembly 400. Current from a battery, for example, within an IMD may be passed into the anode stacks 414 by way of the wire 408. As such, the anode stacks 414 may store current. During discharge, the current within the anode stacks 414 flows to the cathodes 418 and out through the housing 402.

Figure 9:
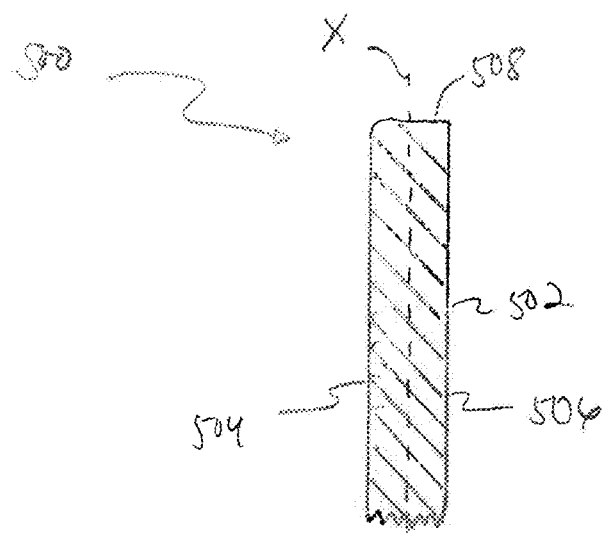
FIG. 9 illustrates a lateral edge view of a lid prior to being formed, according to an embodiment.

FIG. 9 illustrates a lateral edge view of a lid 500 prior to being formed, according to an embodiment. The lid 500 may be used to form the lid 406, shown in FIGS. 4 and 5.

The lid 500 may be formed from a single sheet of material, such as stainless steel, or various other metals. The pre-formed lid 500 includes a planar main body 502 having opposed planar surfaces 504 and 506 connected to opposed ends 508 (only one end 508 is shown in FIG. 9). The planar main body 502 resides in a central longitudinal plane X. In order to form the lid 500, initially, the ends 508 are inwardly folded.

Figure 10:
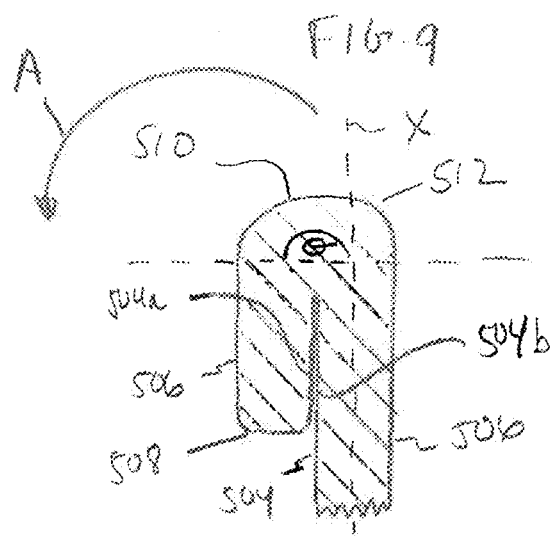
FIG. 10 illustrates a lateral edge view of a lid after an initial forming operation, according to an embodiment.

FIG. 10 illustrates a lateral edge view of the lid 500 after an initial forming operation, according to an embodiment. The ends 508 are folded back toward the plane X in the direction of arc A through a distance θ, which may be 180°. As shown, the ends 508 are folded such that a portion 504a of the planar surface 504 directly abuts against, or is urged toward, a linear portion 504b. In this manner, a folded, double wall 510 is formed at outermost portions 512 of the main body 502.

The folding operation described above may be performed with forming machinery, such as a stamp, press, die, and/or the like. After the folded, double wall 510 is formed, the ends 508 of the main body 502 are turned away from the central longitudinal plane X.

Figure 11:
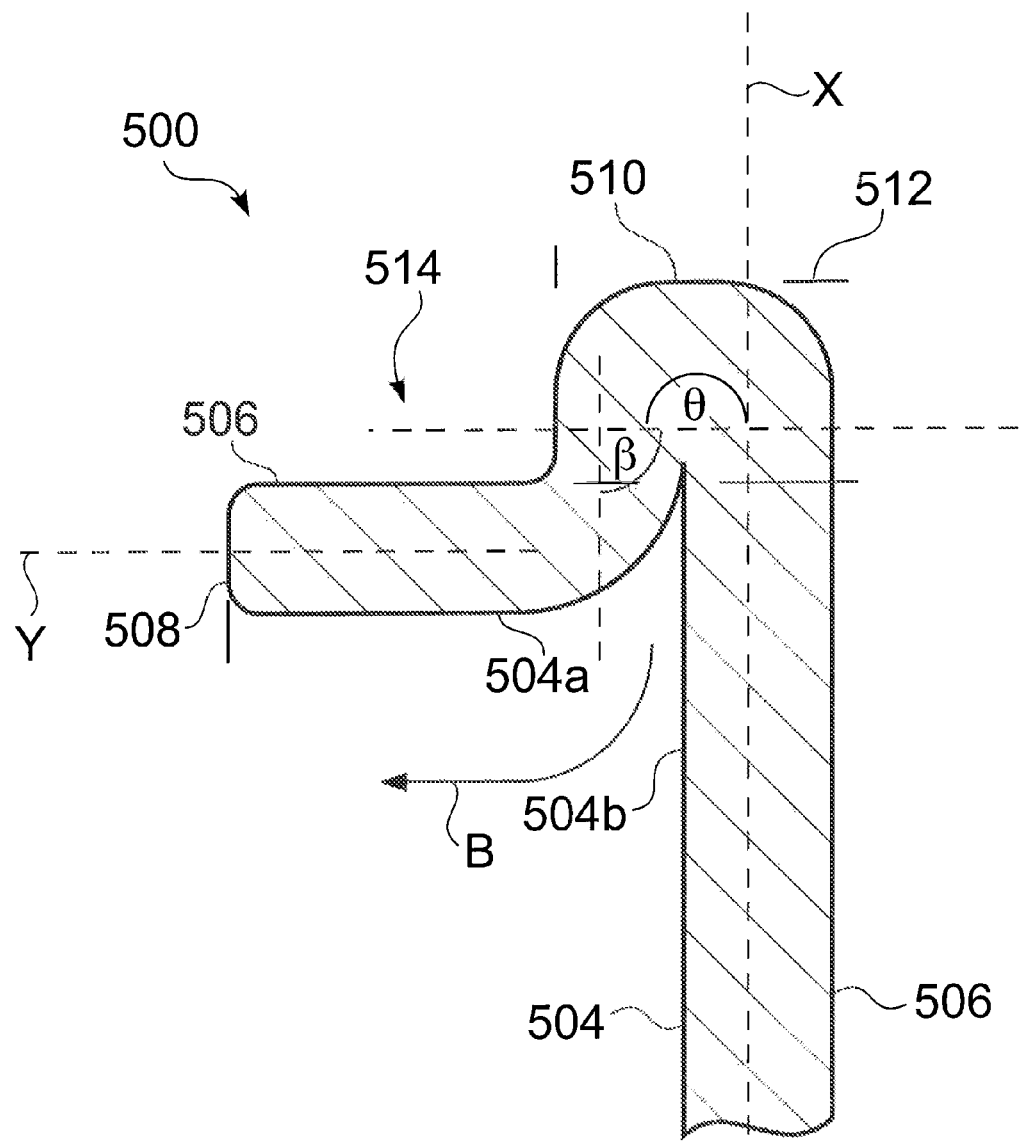
FIG. 11 illustrates a lateral edge view of a formed lid, according to an embodiment.

FIG. 11 illustrates a lateral edge view of a formed lid 500, according to an embodiment. The forming operation continues by the ends 508 being turned away from the longitudinal plane X. The ends 508 are folded away from the plane X in the direction of arc B through a distance which may be 90°. Each end 508 is drawn away from the plane X and may now have a central plane Y that is perpendicular to the plane X. Accordingly, a receiving recessed area 514 is defined between the planar surface 506 of the drawn end 508 and the folded double wall 510. The recessed area 514 is configured to receive an edge portion of a case, such as the case 404 (shown in FIGS. 4 and 5).

Alternatively, instead of bending and forming a piece of material with forming devices, the lid 500 may be cast-molded for example, as an integral unit.

Figure 12:
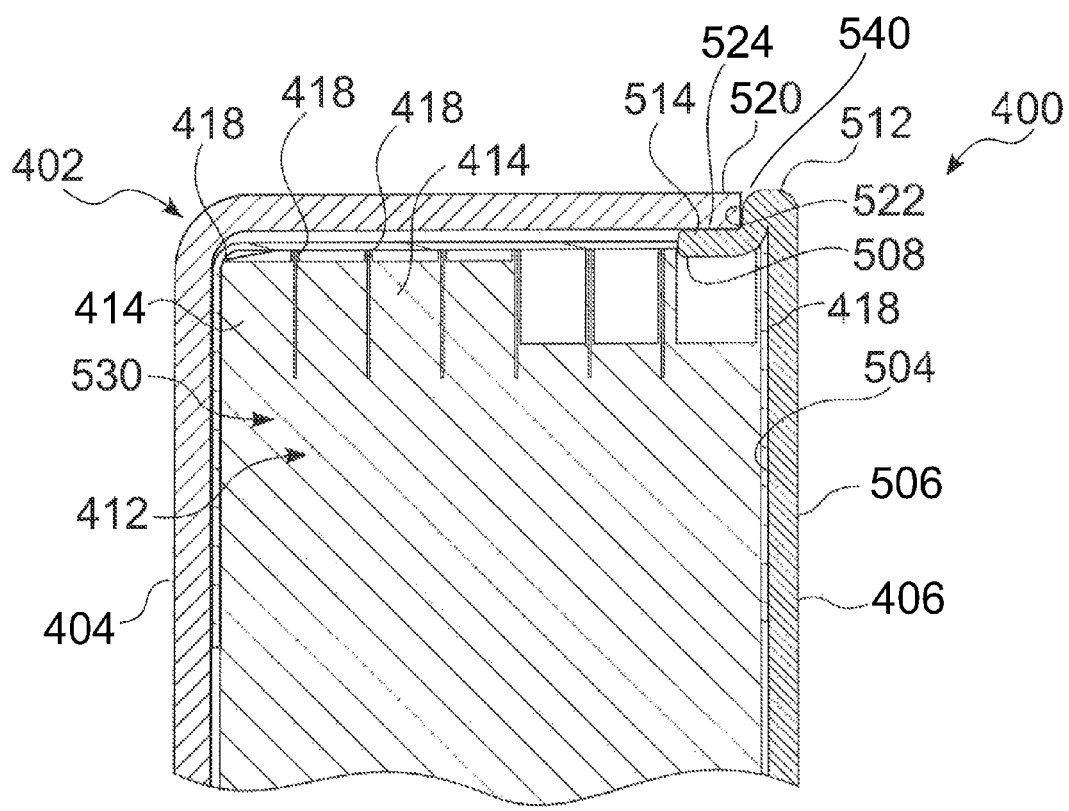
FIG. 12 illustrates a partial internal cross-sectional view of a capacitor assembly through line 12-12 of FIG. 5b, according to an embodiment.

FIG. 12 illustrates a partial internal cross-sectional view of the capacitor assembly 400 through line 12-12 of FIG. 5b, according to an embodiment. In order to secure the case 404 to the lid 406, outer exposed linear edges 520 of the case 404 are positioned within the recessed areas 514 formed in the lid 406. Blunt ends 522 of the linear edges 514 may abut against the folded double walls 510, while interior surfaces 524 of the linear edges 520 are supported over the outer planar surfaces 506 of the recessed areas 514. The outermost portions 512 of the folded double walls 510 may be flush with outer surfaces of the case 404. Alternatively, a portion of the lid 406 may extend above a level of the case 404, or vice versa.

Because the outer walls of the case 404 are linear, there is more room within the internal chamber 530 of the capacitor assembly 400 to accommodate the stack sub-assembly 412. For example, the edges 520 of the case 404 do not inwardly bend or cant. Instead, the edges 514 are linear and are retained within the recessed areas 514 formed in the lid 406. As such, the stack sub-assembly 412 may securely and snugly fit within the internal chamber 530, and the overall size of the housing 400 may be smaller than prior capacitors.

The edges 520 of the case 404 may be securely positioned within the recessed areas 514 through an interference fit, for example. Optionally, the edges 520 may include features, such as tabs, slots, barbs, clasps, latches, openings, and the like, that are configured to mate with reciprocal features on the drawn ends 508 so that the case 404 and lid 406 may snapably or latchably secure together.

The case 404 and the lid 406 may be at various locations of the capacitor assembly 400. For example, the case 404 and the lid 406 may be lateral portions of the housing 402, as shown in FIG. 12. However, the orientation shown in FIG. 12 is merely illustrative. The case 404 and the lid 406 may be configured in various other orientations. For example, a top lid may secure over a bottom case.

In order to securely fasten the housing 402 together, the lid 406 may be laser welded to the case 404 about and around a seam 540 between the blunt ends 522 of the case 404 and the folded double wall 510 of the lid 406.

Figure 13:
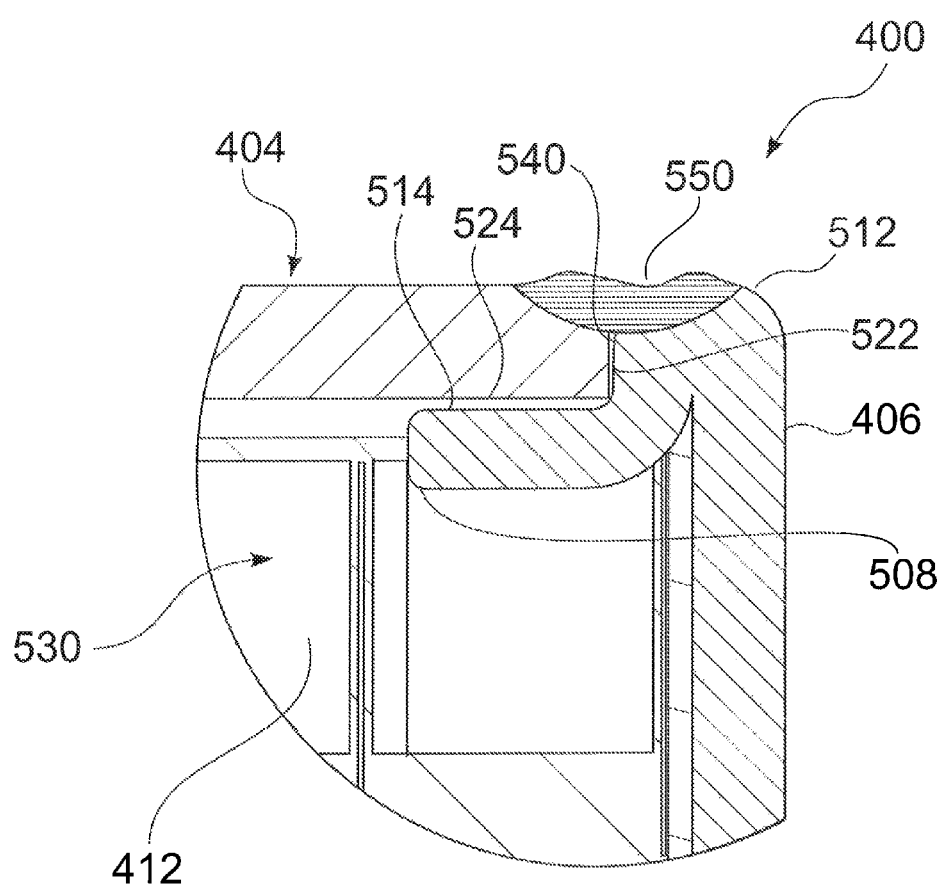
FIG. 13 illustrates a partial internal cross-sectional view of a capacitor assembly having a lid welded to a case, according to an embodiment.

FIG. 13 illustrates a partial internal cross-sectional view of the capacitor assembly 400 having the lid 406 welded to the case 404, according to an embodiment. As shown, a weld 550 is formed between the blunt ends 522 of the case 404 and the folded double wall 510 of the lid 406 at and around the seam 540, thereby securely joining the case 404 to the lid 406, and hermetically sealing the stack sub-assembly 412 within the internal chamber 530 of the capacitor assembly 400.

The drawn end 508 provides a retaining feature that helps hold the housing 402 together prior to and during a welding process. Additionally, the drawn end 508 protects the stack sub-assembly 412 from energy imparted during the laser weld process, for example. The drawn end 508 forms a barrier that blocks laser energy from a welding gun, for example, from passing into the stack sub-assembly 412. Further, the folded double wall 510 provides a wall portion of increased strength. The folded double wall 510 provides a strong, robust surface for welding. Moreover, the folded double wall 510 provides greater surface area for welding. A large weld 550 provides for a more robust connection.

Additionally, the folded double wall 510 provides a barrier that prevents the case 404 from moving there-past. As such, both the case 404 and the lid 406 may be compressively held together during the welding process. Accordingly, the weld 550 may be applied under compression, thereby reducing shrinkage during or after welding. With materials having high coefficients of thermal expansion, such as austenitic stainless steels, stress from shrinkage may lead to solidification cracking. Welding under compression, as is possible with embodiments of the present invention, eliminates or minimizes such cracking.

Figure 14:
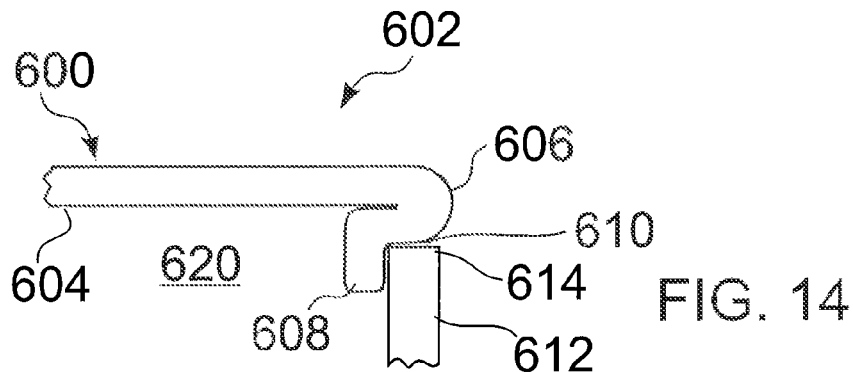
FIG. 14 illustrates a partial internal cross-sectional view of a housing of a capacitor assembly, according to an embodiment.

FIG. 14 illustrates a partial internal cross-sectional view of a housing 600 of a capacitor assembly 602, according to an embodiment. In this embodiment, the case 604 includes a folded double wall 606 and drawn end 608, defining a recessed area 610 therebetween. A linear, unfolded, planar lid 612 includes outer edges 614 that are positioned within the recessed area 610. As shown, the folded double wall 606 may be inwardly-directed toward the internal chamber 620 of the housing 600.

Figure 15:
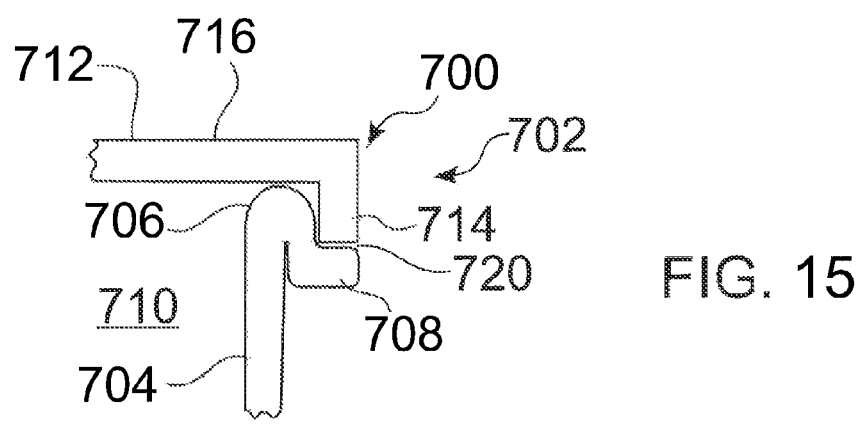
FIG. 15 illustrates a partial internal cross-sectional view of a housing of a capacitor assembly, according to an embodiment.

FIG. 15 illustrates a partial internal cross-sectional view of a housing 700 of a capacitor assembly 702, according to an embodiment. In this embodiment, a lid 704 includes a folded double wall 706 and drawn end 708. However, the drawn end 708 is outwardly-directed from an internal chamber 710 of the housing 700. A case 712 includes clamping ends 714 that may be perpendicular to main wall portions 716. The clamping ends 714 secure into recessed areas 720 of the lid 704.

Figure 16:
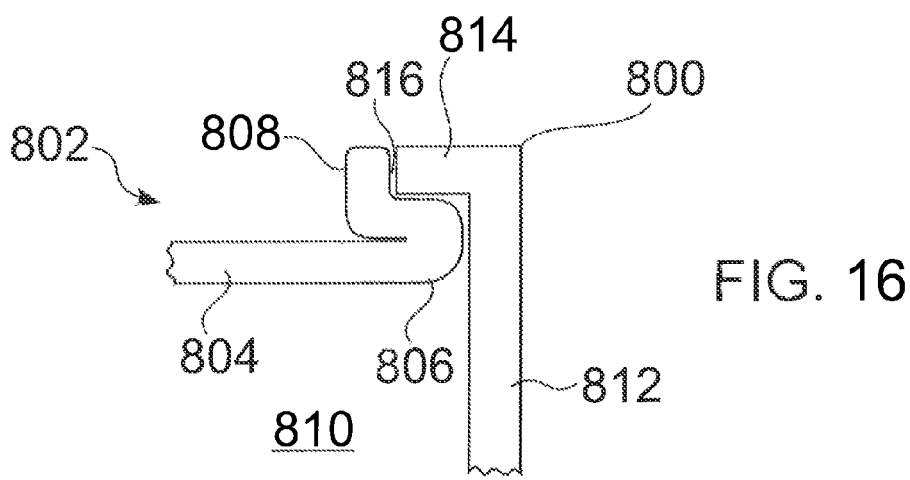
FIG. 16 illustrates a partial internal cross-sectional view of a housing of a capacitor assembly, according to an embodiment.

FIG. 16 illustrates a partial internal cross-sectional view of a housing 800 of a capacitor assembly 802, according to an embodiment. In this embodiment, a case 804 may include a folded double wall 806 and drawn end 808 oriented away from an internal chamber 810 of the housing 800. A lid 812 may include clamping ends 814 that are positioned within recessed areas 816 of the case 804.

Thus, embodiments provide a compact capacitor assembly that is able to accommodate and retain a stack sub-assembly. Embodiments provide a capacitor assembly having a strong, robust interface wall. The folded, double wall is able to support a relatively large weld spot. Embodiments provide a housing for a capacitor assembly that may be compressed before and during a welding process, thereby eliminating or otherwise minimizing cracking caused by shrinkage.

While various spatial and directional terms, such as top, bottom, lower, mid, lateral, horizontal, vertical, front and the like may be used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter disclosed herein without departing from its scope. While the dimensions, types of materials and coatings described herein are intended to define the parameters of the subject matter disclosed herein, they are by no means limiting and are exemplary embodiments. Many other embodiments will be apparent to those of skill in the art upon reviewing the above description. The scope of the subject matter disclosed herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112, sixth paragraph, unless and until such claim limitations expressly use the phrase "means for" followed by a statement of function void of further structure.

The invention claimed is:

1. A capacitor assembly configured for use with an implantable medical device (IMD), the capacitor assembly comprising:
    a stack assembly having at least one anode stack between outer cathodes; and
    a housing having a case secured to a lid, wherein the case and the lid define an internal chamber that retains the stack assembly, wherein one of the case or the lid comprises:
    a planar main body residing in a central plane;
    a folded double wall connected to the planar main body comprising a first linear wall residing in the central pane and a second wall abutting the first linear wall; and
    a drawn end connected to the folded double wall, the drawn end turned away from the central plane, wherein a recessed area is defined between the folded double wall and the drawn end, and wherein a linear edge of the other of the case and the lid is retained within the recessed area.

2. The capacitor assembly of claim 1, wherein the lid comprises the folded double wall and the case comprises the linear edge.

3. The capacitor assembly of claim 1, wherein the case comprises the folded double wall and the lid comprises the linear edge.

4. The capacitor assembly of claim 1, wherein the folded double wall is folded toward the internal chamber.

5. The capacitor assembly of claim 1, wherein the folded double wall is folded away from the internal chamber.

6. The capacitor assembly of claim 1, wherein the folded double wall is folded 180° from the central plane.

7. The capacitor assembly of claim 1, wherein the drawn end is perpendicular to the central plane.

8. The capacitor assembly of claim 1, wherein the lid and case are welded together about a seam proximate the linear edge and the folded double wall, and wherein the drawn end protects the stack assembly from receiving energy imparted during a welding operation.

9. The capacitor assembly of claim 1, wherein the at least one anode stack comprises a plurality of anode stacks separated by isolating dividers.

10. The capacitor assembly of claim 1, wherein the IMD comprises one of a defibrillator or a cardioverter.

11. A method of forming a capacitor assembly configured for use with an implantable medical device (IMD), the method comprising:
    folding an end of a main body of one of a case or lid residing in a central plane, back toward the central plane to form a folded double wall;
    drawing the end away from the central plane to form a drawn end that defines a recessed area with the double wall;
    positioning a stack assembly into an internal chamber of the case; and
    securing the case to the lid by positioning a linear edge of one of the case or lid into the recessed area of the other of the case or lid.

12. The method of claim 11, wherein the lid comprises the folded double wall and the case comprises the linear edge.

13. The method of claim 11, wherein the case comprises the folded double wall and the lid comprises the linear edge.

14. The method of claim 11, wherein the folding operation comprises inwardly-folding the end of the one of case or lid.

15. The method of claim 11, wherein the folding operation comprises outwardly-folding the end of the one of case or lid.

16. The method of claim 11, wherein the folding operation comprises folding the end 180° from the central plane.

17. The method of claim 11, wherein drawing operation comprises perpendicularly drawing the drawn end from the central plane.

18. The method of claim 11, further comprising welding the case and lid together about a seam proximate the linear edge and the folded double wall, and wherein the drawn end protects the stack assembly from receiving energy imparted during the welding operation.

19. A capacitor assembly configured for use with an implantable medical device (IMD), the capacitor assembly comprising:
    a stack assembly having at least one anode stack between outer cathodes; and
    a housing having a case secured to a lid, wherein the case and the lid define an internal chamber that retains the stack assembly, wherein one of the case or the lid comprises:
    a folded double wall comprising a first wall and a second wall, wherein the first wall comprises a linear portion residing in a central plane and the second wall is turned toward the central plane such that the second wall abuts the first wall; and
    a drawn end connected to the folded double wall, wherein the drawn end is turned away from the central plane, wherein a recessed area is defined between the folded double wall and the drawn end, and wherein a linear edge of the other of the case and the lid is retained within the recessed area.

20. The capacitor of claim 19, wherein the folded double wall comprises an outermost portion that is flush with the outer surface of the other of the case and the lid.

* * * * *